US012632211B2

(12) United States Patent
Botcha et al.

(10) Patent No.: US 12,632,211 B2
(45) Date of Patent: May 19, 2026

(54) RECONFIGURATION FOR A MULTI-CHANNEL AUDIO SYSTEM

(71) Applicant: TEXAS INSTRUMENTS INCORPORATED, Dallas, TX (US)

(72) Inventors: Lokesh Kumar Botcha, New Delhi (IN); Venkata Mohana Vamsi Voora, Eluru (IN); Ankit Garg, Bangalore (IN); Supriyo Palit, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 138 days.

(21) Appl. No.: 18/476,420

(22) Filed: Sep. 28, 2023

(65) Prior Publication Data

US 2025/0110686 A1     Apr. 3, 2025

(51) Int. Cl.
*G06F 3/16*          (2006.01)
(52) U.S. Cl.
CPC .............. *G06F 3/162* (2013.01); *G06F 3/165* (2013.01)

(58) Field of Classification Search
CPC ................................ G06F 3/162; G06F 3/165
See application file for complete search history.

(56) References Cited

U.S. PATENT DOCUMENTS 8,879,761 B2 * 11/2014 Johnson et al. ......... H04R 3/12
                                                              700/94
9,241,217 B2 *  1/2016 Rodgers .................. G06F 3/165

* cited by examiner

*Primary Examiner* — Vivian C Chin
(74) *Attorney, Agent, or Firm* — Xianghui Huang; Frank D. Cimino

(57)     ABSTRACT

An apparatus includes an amplifier having an input. An interface has inputs and an output. The interface is configured to: invert each bit of a value received at a first input of the interface to produce an inverted value; and provide the inverted value at the output. A processor has an input coupled the output of the interface, has first output coupled to a second input of the interface, and has a second output coupled to the input of the amplifier. The processor is configured to determine whether to set an adjustable gain setting of an audio processing block to the inverted value.

18 Claims, 13 Drawing Sheets

600

| | DEV-0 SLOT | DEV-1 SLOT | DEV-2 SLOT | DEV-3 SLOT | ∘ ∘ ∘ | DEV-7 SLOT |
|---|---|---|---|---|---|---|
| AF-1 | D0_G | D1_G | D2_G | D3_G | ∘ ∘ ∘ | D7_G |
| AF-2 | D0_G | D1_G | D2_G | D3_G | ∘ ∘ ∘ | D7_G |
| AF-3 | D0_G | D1_G | D2_G | D3_G | ∘ ∘ ∘ | D7_G |
| AF-4 | D0_G | D1_G | D2_G | D3_G | ∘ ∘ ∘ | D7_G |
| AF-5 | D0_G | D1_G | D2_G | D3_G | ∘ ∘ ∘ | D7_G |
| AF-6 | D0_G | D1_G | D2_G | D3_G | ∘ ∘ ∘ | D7_G |
| AF-7 | D0_G | D1_G | D2_G | D3_G | ∘ ∘ ∘ | D7_G |
| AF-8 | D0_G | D1_G | D2_G | D3_G | ∘ ∘ ∘ | D7_G |

700

702  702  702  702  702

| | DEV-0 SLOT | | DEV-1 SLOT | | DEV-2 SLOT | | DEV-3 SLOT | | ∘ ∘ ∘ | DEV-7 SLOT | |
|---|---|---|---|---|---|---|---|---|---|---|---|---|
| AF-1 | 1 | D0_G0 | 1 | D1_G0 | 1 | D2_G0 | 1 | D3_G0 | ∘ ∘ ∘ | 1 | D7_G0 |
| AF-2 | 0 | D0_G1 | 0 | D1_G1 | 0 | D2_G1 | 0 | D3_G1 | ∘ ∘ ∘ | 0 | D7_G1 |
| AF-3 | 0 | D0_G2 | 0 | D1_G2 | 0 | D2_G2 | 0 | D3_G2 | ∘ ∘ ∘ | 0 | D7_G2 |
| AF-4 | 0 | D0_G3 | 0 | D1_G3 | 0 | D2_G3 | 0 | D3_G3 | ∘ ∘ ∘ | 0 | D7_G3 |
| AF-5 | 0 | D0_G4 | 0 | D1_G4 | 0 | D2_G4 | 0 | D3_G4 | ∘ ∘ ∘ | 0 | D7_G4 |
| AF-6 | 0 | D0_G5 | 0 | D1_G5 | 0 | D2_G5 | 0 | D3_G5 | ∘ ∘ ∘ | 0 | D7_G5 |
| AF-7 | 0 | D0_G6 | 0 | D1_G6 | 0 | D2_G6 | 0 | D3_G6 | ∘ ∘ ∘ | 0 | D7_G6 |
| AF-8 | 0 | D0_G7 | 0 | D1_G7 | 0 | D2_G7 | 0 | D3_G7 | ∘ ∘ ∘ | 0 | D7_G7 |
| AF-9 | 1 | D0_G0 | 1 | D1_G0 | 1 | D2_G0 | 1 | D3_G0 | ∘ ∘ ∘ | 0 | D7_G0 |
| AF-10 | 0 | D0_G1 | 0 | D1_G1 | 0 | D2_G1 | 0 | D3_G1 | ∘ ∘ ∘ | 0 | D7_G1 |
| AF-11 | 0 | D0_G2 | 0 | D1_G2 | 0 | D2_G2 | 0 | D3_G2 | ∘ ∘ ∘ | 0 | D7_G2 |
| AF-12 | 0 | D0_G3 | 0 | D1_G3 | 0 | D2_G3 | 0 | D3_G3 | ∘ ∘ ∘ | 0 | D7_G3 |
| AF-13 | 0 | D0_G4 | 0 | D1_G4 | 0 | D2_G4 | 0 | D3_G4 | ∘ ∘ ∘ | 0 | D7_G4 |
| AF-14 | 0 | D0_G5 | 0 | D1_G5 | 0 | D2_G5 | 0 | D3_G5 | ∘ ∘ ∘ | 0 | D7_G5 |
| AF-15 | 0 | D0_G6 | 0 | D1_G6 | 0 | D2_G6 | 0 | D3_G6 | ∘ ∘ ∘ | 0 | D7_G6 |
| AF-16 | 0 | D0_G7 | 0 | D1_G7 | 0 | D2_G7 | 0 | D3_G7 | ∘ ∘ ∘ | 0 | D7_G7 |

702A   702B   702C   702D   FIG. 9

| | DEV-0 SLOT | | DEV-1 SLOT | | DEV-2 SLOT | | DEV-3 SLOT | | ∘ ∘ ∘ | DEV-7 SLOT | |
|---|---|---|---|---|---|---|---|---|---|---|---|
| AF-0 | 0 | 0000 | 0 | 0000 | 0 | 0000 | 0 | 0000 | ∘ ∘ ∘ | 0 | 0000 |
| AF-1 | 0 | 0000 | 0 | 0000 | 0 | 0000 | 0 | 0000 | ∘ ∘ ∘ | 0 | 0000 |
| AF-2 | 0 | 0000 | 0 | 0000 | 0 | 0000 | 0 | 0000 | ∘ ∘ ∘ | 0 | 0000 |
| AF-3 | 0 | 0000 | 0 | 0000 | 0 | 0000 | 0 | 0000 | ∘ ∘ ∘ | 0 | 0000 |
| AF-4 | 0 | 0000 | 0 | 0000 | 0 | 0000 | 0 | 0000 | ∘ ∘ ∘ | 0 | 0000 |
| AF-5 | 0 | 0000 | 0 | 0000 | 0 | 0000 | 0 | 0000 | ∘ ∘ ∘ | 0 | 0000 |
| AF-6 | 0 | 0000 | 0 | 0000 | 0 | 0000 | 0 | 0000 | ∘ ∘ ∘ | 0 | 0000 |
| AF-7 | 0 | 0000 | 0 | 0000 | 0 | 0000 | 0 | 0000 | ∘ ∘ ∘ | 0 | 0000 |
| AF-8 | 0 | 0000 | 0 | 0000 | 0 | 0000 | 0 | 0000 | ∘ ∘ ∘ | 0 | 0000 |
| AF-9 | 1 | D0_G0 | 0 | 0000 | 0 | 0000 | 0 | 0000 | ∘ ∘ ∘ | 0 | 0000 |
| AF-10 | 0 | D0_G1 | 0 | 0000 | 0 | 0000 | 0 | 0000 | ∘ ∘ ∘ | 0 | 0000 |
| AF-11 | 0 | D0_G2 | 0 | 0000 | 0 | 0000 | 0 | 0000 | ∘ ∘ ∘ | 0 | 0000 |
| AF-12 | 0 | D0_G3 | 0 | 0000 | 0 | 0000 | 0 | 0000 | ∘ ∘ ∘ | 0 | 0000 |
| AF-13 | 0 | D0_G4 | 0 | 0000 | 0 | 0000 | 0 | 0000 | ∘ ∘ ∘ | 0 | 0000 |
| AF-14 | 0 | D0_G5 | 0 | 0000 | 0 | 0000 | 0 | 0000 | ∘ ∘ ∘ | 0 | 0000 |
| AF-15 | 0 | D0_G6 | 0 | 0000 | 0 | 0000 | 0 | 0000 | ∘ ∘ ∘ | 0 | 0000 |
| AF-16 | 0 | D0_G7 | 0 | 0000 | 0 | 0000 | 0 | 0000 | ∘ ∘ ∘ | 0 | 0000 |
| AF-17 | 1 | D0_G0 | 0 | 0000 | 0 | 0000 | 0 | 0000 | ∘ ∘ ∘ | 0 | 0000 |
| AF-18 | 0 | D0_G1 | 0 | 0000 | 0 | 0000 | 0 | 0000 | ∘ ∘ ∘ | 0 | 0000 |
| AF-19 | 0 | D0_G2 | 0 | 0000 | 0 | 0000 | 0 | 0000 | ∘ ∘ ∘ | 0 | 0000 |
| AF-20 | 0 | D0_G3 | 0 | 0000 | 0 | 0000 | 0 | 0000 | ∘ ∘ ∘ | 0 | 0000 |
| AF-21 | 0 | D0_G4 | 0 | 0000 | 0 | 0000 | 0 | 0000 | ∘ ∘ ∘ | 0 | 0000 |
| AF-22 | 0 | D0_G5 | 0 | 0000 | 0 | 0000 | 0 | 0000 | ∘ ∘ ∘ | 0 | 0000 |

DEV-0 POWERED UP HERE → AF-1

DEV-1 POWERED UP HERE → AF-12

DEV-3 POWERED UP HERE → AF-13

DEV-0 POWERED DOWN HERE → AF-18

DEV-2 POWERED UP HERE → AF-21

TO FIG. 9 (CONT.)

FROM FIG. 9

| | | | | | | | | | | |
|---|---|---|---|---|---|---|---|---|---|---|
| AF-23 | 0 | D0_G6 | 0 | 0000 | 0 | 0000 | 0 | 0000 | o o o | 0 | 0000 |
| AF-24 | 0 | D0_G7 | 0 | 0000 | 0 | 0000 | 0 | 0000 | o o o | 0 | 0000 |
| AF-25 | 0 | 0000 | 1 | D1_G0 | 0 | 0000 | 1 | D3_G0 | o o o | 0 | 0000 |
| AF-26 | 0 | 0000 | 0 | D1_G1 | 0 | 0000 | 0 | D3_G1 | o o o | 0 | 0000 |
| AF-27 | 0 | 0000 | 0 | D1_G2 | 0 | 0000 | 0 | D3_G2 | o o o | 0 | 0000 |
| AF-28 | 0 | 0000 | 0 | D1_G3 | 0 | 0000 | 0 | D3_G3 | o o o | 0 | 0000 |
| AF-29 | 0 | 0000 | 0 | D1_G4 | 0 | 0000 | 0 | D3_G4 | o o o | 0 | 0000 |
| AF-30 | 0 | 0000 | 0 | D1_G5 | 0 | 0000 | 0 | D3_G5 | o o o | 0 | 0000 |
| AF-31 | 0 | 0000 | 0 | D1_G6 | 0 | 0000 | 0 | D3_G6 | o o o | 0 | 0000 |
| AF-32 | 0 | 0000 | 0 | D1_G7 | 0 | 0000 | 0 | D3_G7 | o o o | 0 | 0000 |
| AF-33 | 0 | 0000 | 1 | D1_G0 | 1 | D2_G0 | 1 | D3_G0 | o o o | 0 | 0000 |
| AF-34 | 0 | 0000 | 0 | D1_G1 | 0 | D2_G1 | 0 | D3_G1 | o o o | 0 | 0000 |
| AF-35 | 0 | 0000 | 0 | D1_G2 | 0 | D2_G2 | 0 | D3_G2 | o o o | 0 | 0000 |
| AF-36 | 0 | 0000 | 0 | D1_G3 | 0 | D2_G3 | 0 | D3_G3 | o o o | 0 | 0000 |
| AF-37 | 0 | 0000 | 0 | D1_G4 | 0 | D2_G4 | 0 | D3_G4 | o o o | 0 | 0000 |
| AF-38 | 0 | 0000 | 0 | D1_G5 | 0 | D2_G5 | 0 | D3_G5 | o o o | 0 | 0000 |
| AF-39 | 0 | 0000 | 0 | D1_G6 | 0 | D2_G6 | 0 | D3_G6 | o o o | 0 | 0000 |
| AF-40 | 0 | 0000 | 0 | D1_G7 | 0 | D2_G7 | 0 | D3_G7 | o o o | 0 | 0000 |

1101 — RECEIVE FIRST GAIN SETTING FROM BUS 116

1102 — INVERT EACH BIT OF FIRST GAIN SETTING TO PRODUCE FIRST INVERTED GAIN SETTING

1103 — RECEIVE SECOND GAIN SETTING FROM PROCESSOR

1104 — INVERT EACH BIT OF SECOND GAIN SETTING TO PRODUCE SECOND INVERTED GAIN SETTING

RECONFIGURATION FOR A MULTI-CHANNEL AUDIO SYSTEM

BACKGROUND

Audio systems are becoming more complex. In an example, an audio system may include multiple pairs of woofer-tweeters and dual membrane speakers and have, for example, 6-8 amplifiers. Such audio topologies may include, for example, 2.0, 2.1, and 2.2 topologies. A host processor may be coupled to each of the amplifiers and provide the audio data to each respective amplifier and its associated speaker(s). Within a given audio system, some of the amplifiers and their corresponding speakers may be paired together. For example, a front left amplifier and speaker may be paired with a front right amplifier and speaker.

Each amplifier within the audio system may have one or more processing circuits, and each processing circuit may have a gain setting that is either preset or is dynamically adjustable. Achieving balanced audio by synchronizing gain settings in some audio systems is fairly straightforward. Namely, in these systems, the host processor adjusts the same gain settings for the corresponding processing circuits of the amplifiers within a given pair of amplifiers. For other types of audio systems (e.g., audio systems within a personal computer, laptop computer, or tablet device), where the host device does not perform this synchronization, achieving balanced audio is more challenging.

SUMMARY

In one example, an apparatus includes an amplifier having an input and a circuit having an output coupled to the input of the amplifier. The circuit includes first and second audio processing blocks. The first audio processing block has a first adjustable gain setting and the second audio processing block has a second adjustable gain setting. The circuit is configured to: set a header bit in a first data packet to a first logic state and transmit a first gain setting value for the first audio processing block in the first data packet; set a header bit in a second data packet to a second logic state and transmit a second gain setting value for the second audio processing block in the second data packet; receive a third data packet having a header bit at the first logic state. The third data packet contains a third gain setting value for a first audio processing block of a paired apparatus. A fourth data packet is received having a header bit at the second logic state, and the fourth data packet contains a fourth gain setting for a second audio processing block of the paired apparatus. The circuit is further configured to: set the first adjustable gain setting to the first or third gain setting value and set the second adjustable gain setting to the second or fourth gain setting value.

BRIEF DESCRIPTION OF THE DRAWINGS

FIG. 9 is a table illustrating audio devices powering on asynchronously and synchronizing their gain settings using header bits, in an example.

DETAILED DESCRIPTION

Figure 1:
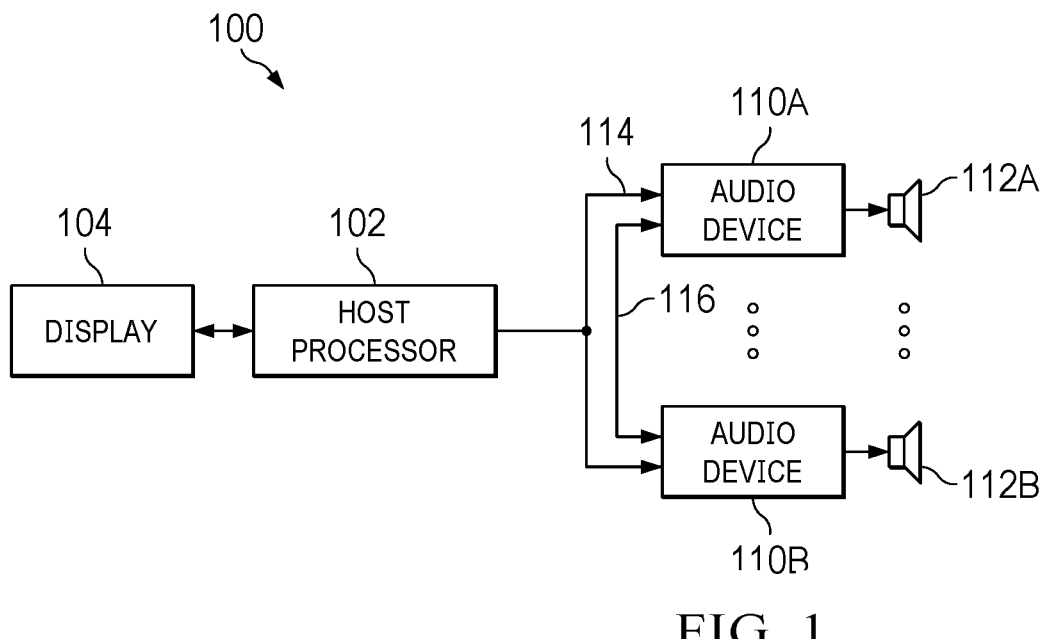
FIG. 1 is a schematic diagram of an audio system having multiple audio devices, in an example.

The same reference numbers or other reference designators are used in the drawings to designate the same or similar (either by function and/or structure) features.

In systems where the host processor does not adjust the gain settings, the amplifiers may be coupled over a common bus and can exchange gain settings between themselves. However, the number of bits of the gain settings for each amplifier may be quite high (e.g., 216 bits). It may be problematic to transmit such a large number of bits between amplifiers, particularly if the system includes 6 or 8 amplifiers. The situation is exacerbated for tablet devices in which the user can change the orientation of the system (e.g., landscape to portrait, and vice versa). Such change in orientation, which may be detected by an accelerometer or other type of sensor, may result in different sets of amplifier/speakers being paired together, which also includes adjusting the gain settings of the amplifiers. A dynamic change (e.g., during runtime) of gain settings may undesirably result in audio artefacts (e.g., "pops" and "clicks") Examples described herein address at least some of these challenges.

FIG. 1 is a block diagram of an audio system 100 including a host processor 102, a display 104, audio devices 110a and 110b (collectively, audio devices 110), and speakers 112a and 122b (collectively, speakers 112). The example of FIG. 1 shows a single host processor 102 coupled to the audio devices 110. However, two or more host processors 102 can be coupled to the audio devices 110 in other examples. Host processor 102 couples to the audio devices 110 by way of a bus 114 and transfers audio data to the audio devices 110 via bus 114. Two audio devices 110a and 110b are shown in the example of FIG. 1. However, in other examples, more than two audio devices 112, e.g., 3, 4, 5, 6, 7, 8, or more, audio devices, can be coupled to the host processor 102. The audio devices 110 are coupled to each other over a multi-drop bus 116 over which information, such as gain settings, can be exchanged between the audio devices. Each audio device 110 is coupled to at least one speaker 112.

Host processor 102 transmits audio data to each respective audio device 110. The audio device 110 processes the audio data and amplifies a resulting audio signal to provide to the respective speaker 112. Host processor 102 is also coupled to a display 104. In some examples, display 104 is a touch-sensitive display. Accordingly, the display 104 can display information transmitted to it by the host processor 102. Also, the display 104 can receive input from a user and transmit such input to the host processor 102. In one example, audio system 100 implements the SoundWire® protocol. In other examples, audio system 100 can implement other audio protocols.

Audio system 100 can be implemented in a variety of forms such as a personal computer (PC), a laptop computer, a tablet device, etc. As a tablet device, the audio system 100 can be used in a portrait orientation or a landscape orientation. Accordingly, the tablet device can be rotated 90 degrees from one orientation to another. The tablet device detects such re-orientations and adjusts the displayed information per the orientation the user has chosen.

Figure 2:
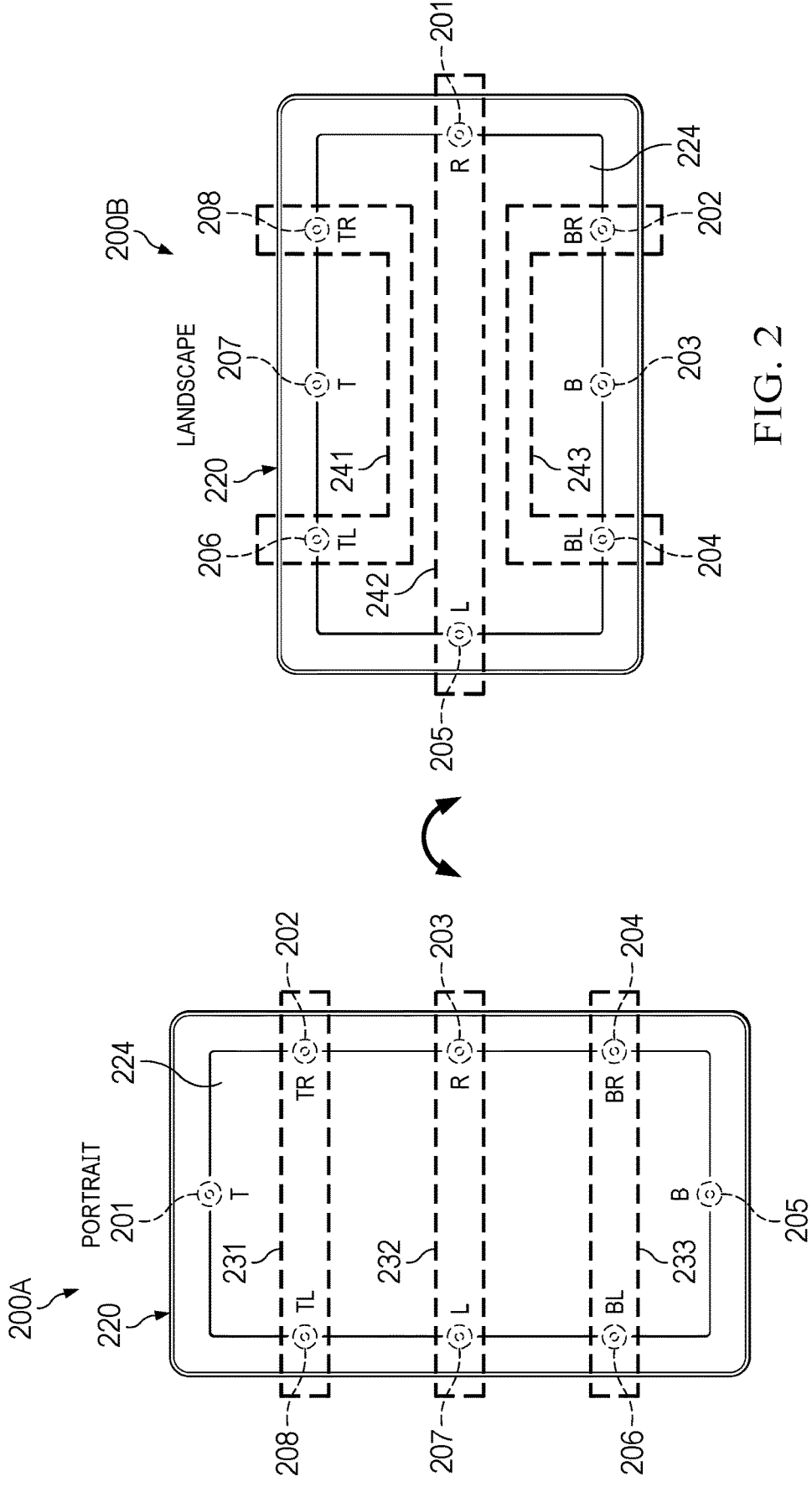
FIG. 2 is an illustration showing changes in the pairing of audio devices upon a change in a system's orientation between portrait and landscape, in an example.

FIG. 2 is a schematic representation of a tablet device 200 in a first orientation 200a, e.g., portrait, and a second orientation 200b, e.g., landscape. In an example, tablet device 200 is an implementation of audio system 100 of FIG. 1. Accordingly, tablet device 200 includes a host processor (not shown) which is an implementation of the host processor 102, and is referred to as the host processor 102. Tablet device 200 includes a housing 220 which contains a display 224, e.g., a touch-sensitive display, which is an implementation of display 104. In this example, tablet device 200 includes eight audio devices 201, 202, 203, 204, 205, 206, 207, and 208 and corresponding speakers 112, which are implementations of audio devices 110 and speakers 112. In one example, audio devices 201-208 and the corresponding speakers 112 are hidden by a grill formed in the housing. In another example, speakers 112 are arranged around the periphery of housing 220, and the corresponding audio devices 201-208 are located elsewhere. To reduce interference from changing, e.g., corrupting, the signals between audio devices 201-208 and the corresponding speakers 112, the audio devices 201-208 may be located near the corresponding speakers 112.

For the first orientation 200a, audio devices 202 and 208 are paired together as indicated by dashed outline 231. Audio devices 202 and 208 may represent the front left and right audio channels when the tablet device 200 is in the portrait orientation. Similarly, audio devices 203 and 207 are paired together, representing the left and right audio channels, as indicated by dashed outline 232. Audio devices 204 and 206 are paired together, representing the back left and right audio channels, as indicated by dashed outline 233. For the first orientation 200a, audio devices 201 and 205 are not paired with each other or any of the other audio devices. Host processor 102 transmits configuration information to the audio devices 201-208 to inform each audio device whether it is paired with another audio device and, if it is paired with another audio device, the identity of that audio device. In this manner, for an audio device that is to be paired with another audio device, host processor 102 configures each such audio device with an identifier of the other/paired audio device. In one example, each audio device 201-208 has a unique identifier such as an address or other type of identifier.

As described below, within a given pairing of audio devices, the paired audio devices perform a synchronization process to facilitate audio devices implementing the same gain settings. For example, the gain settings for audio device 202 will be the same as for its partner audio device 208. The gain settings for audio device 203 will be the same as for its partner audio device 207. However, the gain settings for audio devices 203 and 207 may be different from the gain settings of audio devices 202 and 208. Similarly, the gain settings for audio device 204 will be same as for its partner audio device 206. However, the gain settings for audio devices 204 and 206 may be different from the gain settings of audio devices 202 and 208 and audio devices 203 and 207.

For the second orientation 200b, host processor 102 pairs together the audio devices 201-208 differently than for the first orientation 200a. For the second orientation 200b, audio devices 206 and 208 are paired together as indicated by dashed outline 241. Host processor 102 also pairs together audio devices 201 and 205 as indicated by dashed outline 242 and pairs together audio devices 202 and 204 as indicated by dashed outline 243. Audio devices 203 and 207 are not paired with another audio device.

Figure 3:
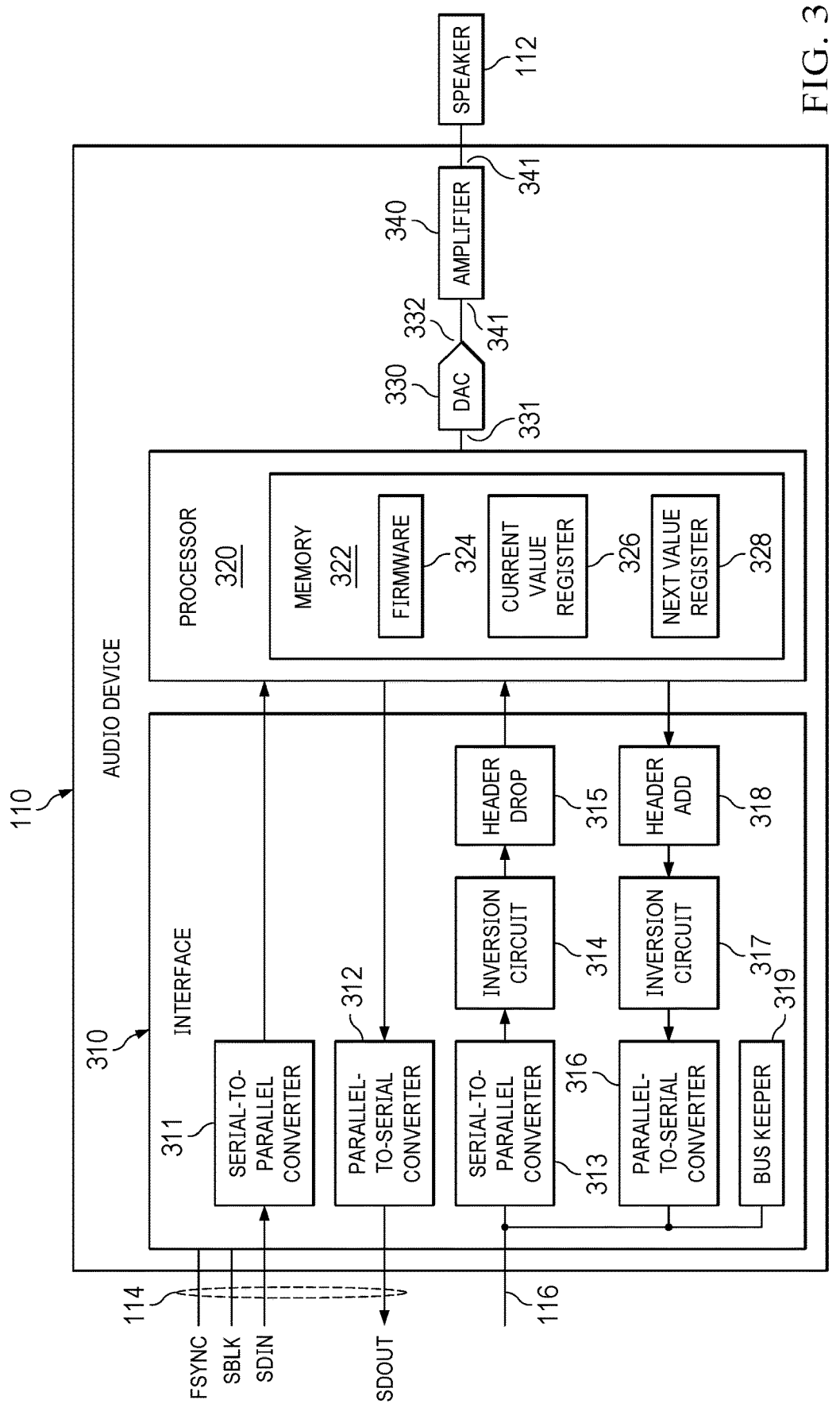
FIG. 3 is a block diagram of an audio device of FIG. 1, in an example.

FIG. 3 is a block diagram of an example audio device 110, and audio device 201-208. In this example, audio device 110 includes an interface 310, a processor 320, a digital-to-analog converter (DAC) 330, and an amplifier 340. Interface 310 includes connections to buses 114 and 116. Interface 310 is coupled to processor 320, and processor 320 is coupled to an input 331 of DAC 330. An output 332 of DAC 330 is coupled to an input 341 of amplifier 340, and an output 342 of amplifier 340 is coupled to speaker 112.

Interface 310 includes serial-to-parallel (S2P) converters 311 and 313, parallel-to-serial (P2S) converter 312 and 316, inversion circuits 314 and 317, a header drop circuit 315, a header add circuit 318, and a bus keeper circuit 319. In this example, bus 114 is an Inter-Integrated Circuit Sound (I2S) bus to transport signals including Serial Data In (SDIN), Serial Data Out (SDOUT), Frame Synchronization (FSYNC), and Serial Clock (SCLK) signals. SDIN is a serial signal provided from the host processor 102 to an input of S2P converter 311. S2P converter 311 converts SDIN to a parallel representation. In one example, one bit is transmitted over bus 114 during each period of SCLK. The FSYNC signal marks the beginning of a word in the serial stream and differentiates the left audio channel from the right audio channel. The parallel output of S2P converter 311 couples to processor 320. A parallel output from processor 320 is coupled to a parallel input of P2S converter 312, to transport parallel data. P2S converter 312 converts the parallel data to a serial signal SDOUT for transmission on bus 114 as to host processor 102.

S2P converter 313 converts serial data from bus 116 (from another audio device) to a parallel representation. The output of S2P converter 313 is coupled to an input of inversion circuit 314. As described below, inversion circuit 314 performs a bitwise inversion of the bits of the parallel representation from S2P converter 313. The output of inversion circuit 314 is coupled to an input of header drop circuit 315 (described below). The output of header drop circuit 315 is coupled to processor 320. The header drop circuit 315 also indicates to processor 320 whether the header bit that was dropped was a "1" or a "0."

An output of processor 320 is coupled to an input of header add circuit 318 (described below). The output of header add circuit 318 is coupled to an input of inversion circuit 317, the output of which is coupled to an input of P2S converter 316. The output of P2S converter 316 is coupled to bus 116. Bus keeper 319 is also coupled to bus 116. Bus keeper 319 provides light loading of bus 116, thereby keeping bus 116 from floating. In one example, bus keeper 319 is a delay circuit, such as two series-connected inverters, with its output connected to its input through relatively a high impedance element (e.g., a resistor). The impedance element drives the bus weakly to maintain its voltage level, but other circuits can readily override value of the bus.

Processor 320 includes memory 322 (e.g., random access memory) in which firmware 324, executable by processor 320, is stored. In this example, memory 322 also includes a current value register (CVR) 326 and a next value register (NVR) 328.

Audio data provided by host processor 102 is transmitted over bus 114 as the SDIN signal and converted to parallel data by S2P converter 311. The parallel audio data is then provided to processor 320 for further processing, e.g., equalization, compression, speaker protection limit, etc. The processed audio data is converted to an analog signal by DAC 330 and provided to amplifier 340, which amplifies the analog signal and drives speaker 112. Other types of data/ signals are processed by the circuits 313-318 of interface 310 and transferred over bus 116 between the audio devices 110 to facilitate audio device synchronization.

Figure 4:
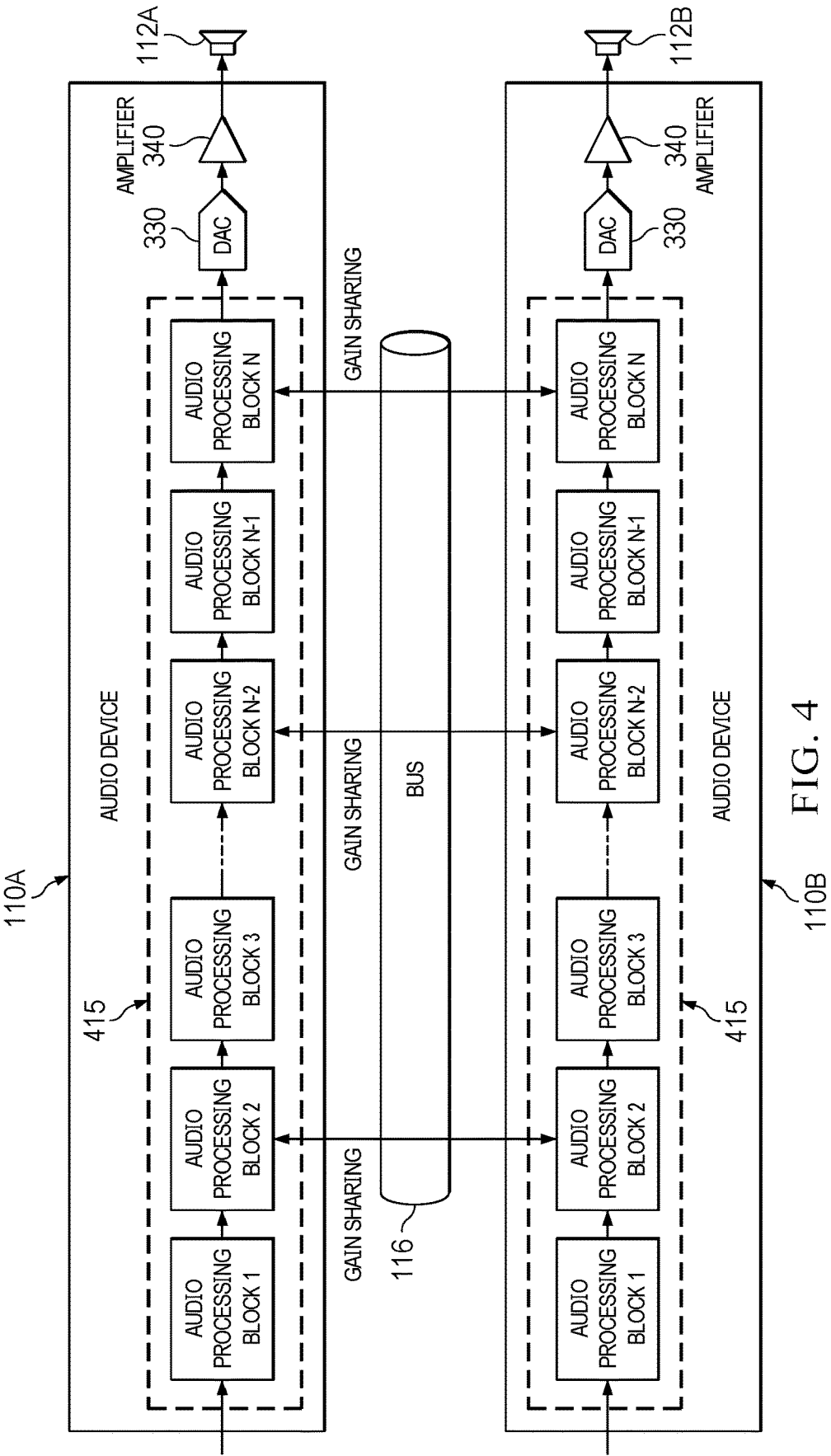
FIG. 4 is a block diagram illustrating two audio devices sharing gain settings, in an example.

FIG. 4 is a block diagram illustrating portions of two audio devices 110a and 110b coupled together by way of bus 116, with each audio device having multiple processing stages 415. Processing stages 415 include Audio Processing Block 1, Audio Processing Block 2, . . . , to Audio Processing Block N, where N is an integer greater than 0. In one example, the Audio Processing Blocks 1-N are implemented by the audio device's processor 320 executing firmware 324. In other examples, the Audio Processing Blocks 1-N are circuits, for example one or more application-specific integrated circuits or one ore more field-programmable gate arrays. The processing performed on the audio from host processor 102 can be any suitable type of audio processing. In an example, gain sharing can be performed using bus 116. For instance, gain sharing includes transferring one or more gain settings, e.g., in the form of a gain value, for one or more of the audio processing blocks of the audio devices 110 using the bus 116. One or more gain settings or gain values may initially be provided by the host processor 102 to maximize the audio signal and minimize distortion in each processing block of an audio device.

Figure 5:
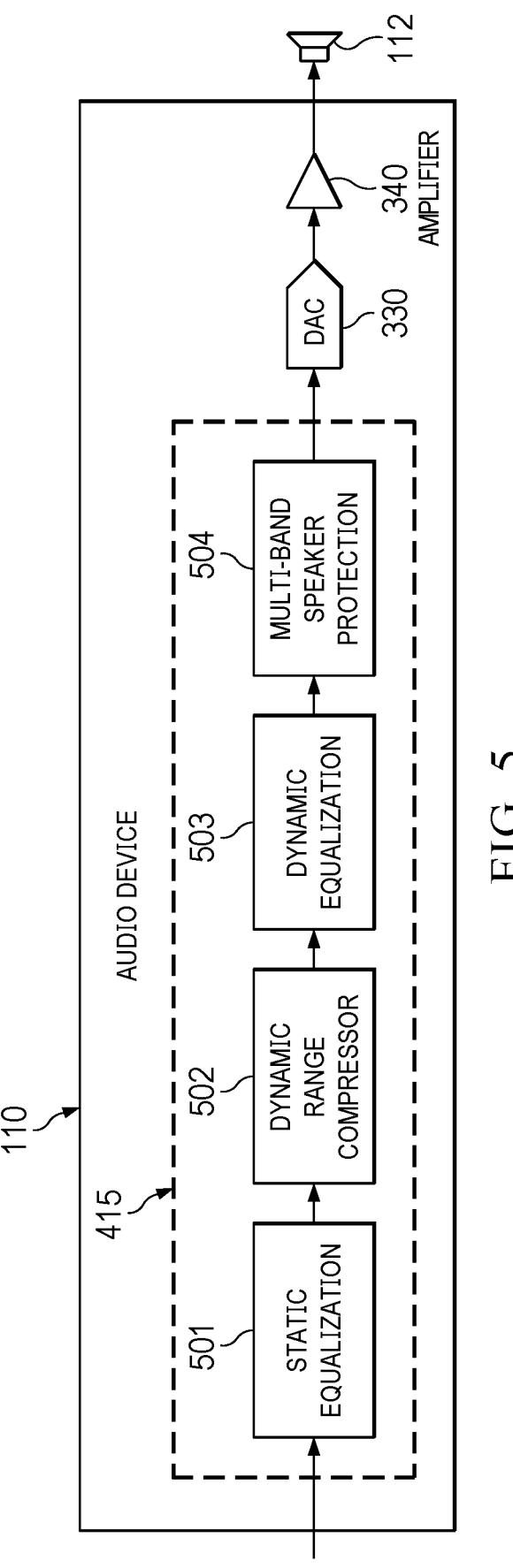
FIG. 5 is a block diagram showing processing circuits within an audio device, in an example.

FIG. 5 is an example block diagram of an audio device 110 in which the processing stages 415 include an Audio Processing Block 501 that performs static equalization, an Audio Processing Block 502 that performs dynamic range compression, an Audio Processing Block 503 that performs dynamic equalization, and an Audio Processing Block 504 that performs multi-band speaker protection. Multi-band speaker protection may include turning off or reducing the signal amplitude to a speaker responsive to detecting an over-temperature condition or excessive diaphragm movement.

Some, or all, of the Audio Processing Blocks have a gain setting associated with each such processing block. For example, each of Audio Processing Blocks 1 to N has a gain setting. The gain setting of each of the Audio Processing Blocks may be different or the same as the gain setting of any other Audio Processing Block. The gain setting for one or more of the Audio Processing Blocks may be statically set. For example, the gain setting is statically set during an initialization process of the audio device 110 and does not dynamically change during runtime. The gain setting of one or more of the Audio Processing Blocks can dynamically change during runtime. In the example in which the Audio Processing Blocks include static equalization, dynamic range compression, dynamic equalization, and multi-band speaker protection, the gain setting of the static equalization Audio Processing Block is statically set, but the gain setting of the dynamic range compression, dynamic equalization, and multi-band speaker protection Audio Processing Blocks can change during run-time.

The processed audio signal from the processing stages 415 is provided to DAC 330 for, as described above, conversion to an analog signal. The analog signal is then provided to amplifier 340 for amplification. Amplifier 340 may have a gain setting that is statically set. Accordingly, the gain setting for amplifier 340 does not change during runtime of audio device 110.

As described above, some of the audio devices 110 may be paired together by host processor 102 based, for example, on the orientation of audio system (e.g., tablet device). In some described examples, for the audio devices within a given pairing, the gain settings of the corresponding Audio Processing Blocks of the audio devices are adjusted to have the same value. For example, the gain settings for the dynamic range compressor Audio Processing Blocks 502 of the paired audio devices 110 are adjusted to have the same value. Similarly, the gain settings for the dynamic equalization Audio Processing Blocks 503 of the paired audio devices 110 are adjusted to have the same value. Additionally, the gain settings for the multi-band speaker protection Audio Processing Blocks 504 of the paired audio devices 110 are adjusted to have the same value. The gain setting for the corresponding pair of Audio Processing Blocks may be different (or the same) as the gain setting for any other corresponding pair of Audio Processing Blocks.

In one example, the audio devices 110 perform a synchronization process by which the audio devices exchange gain settings of their dynamic Audio Processing Blocks. Accordingly, each audio device 110 within a given pair can adjust the gain settings of its Audio Processing Blocks to have the same gain setting values as those of the other audio device in the pair.

Figure 6:
FIG. 6 is a table illustrating a technique to populate audio frames with gain settings, in an example.

FIG. 6 is a table 600 illustrating one technique for the audio devices 110 to exchange gain settings among themselves over bus 116. Each row of table 600 corresponds to an audio frame (AF) such as a SoundWire® audio frame. The example table 600 of FIG. 6 includes eight audio frames AF-1 through AF-8. Each audio frame AF-1 through AF-8 is divided into multiple time slots. In one example, the host processor 102 assigns each audio device 110 a specific time slot in each audio frame in which to transmit data. In one example, in accordance with the SoundWire® specification, each audio device is made aware of its time slot during an enumeration process which occurs during audio device powerup. The relationship between the audio device's own time slot and the SoundWire frame startpoint is configured into the audio device. Further, host processor 102 provides configuration information to an audio device indicating the time slot of its paired partner, if any.

Table 600 is an example in which eight audio devices Dev-0 through Dev-7 are allocated time slots within each audio frame. In this example technique, each audio device 110 has multiple gain settings. The multiple gain settings for audio device Dev-0 are represented as D0_G. The multiple gain settings for audio device Dev-1 are represented as D1_G, and so on. As illustrated, each audio device transmits all its gain setting in its respective slot in each of the audio frames AF-1 through AF-8.

The number of bits within each audio frame is a function of the frequency of the clock used to transmit data across bus 116 and of the audio frame rate. The SoundWire® specification, for example, allows for a maximum clock frequency of 12.288 MHZ, and the audio frame rate may be 48,000 audio frames per second. In the Soundwire® protocol, both edges of a clock are used to transmit data (e.g., a double data rate protocol). The number of bits available for each audio frame given a 12.288 MHz clock frequency and a frame rate of 48,000 frames per second is:

$$\text{Number of bits per frame} = \frac{12{,}288{,}000 * 2}{48{,}000} = 512 \qquad \text{(Eq. 1)}$$

Allocating 512 bits for each audio frame across, for example, eight audio devices results in each audio device only being allocated 64 bits for its data. Accordingly, in this example, even at the highest frequency allowed per, for example, the SoundWire® specification, each audio device 110 would only have 64 bits to transmit the gain settings of its multiple dynamic Audio Processing Blocks. Depending on the number of dynamic gain settings for each audio device and the number of bits of each gain setting. 64 bits may not be enough bits for each audio device 110 to transmit all of its gain settings in one audio frame within its given time slot. This may be the case, particularly, with a large number of audio devices 110 (e.g., 6, 8, etc.) exchanging multiple gain settings.

Figure 7:
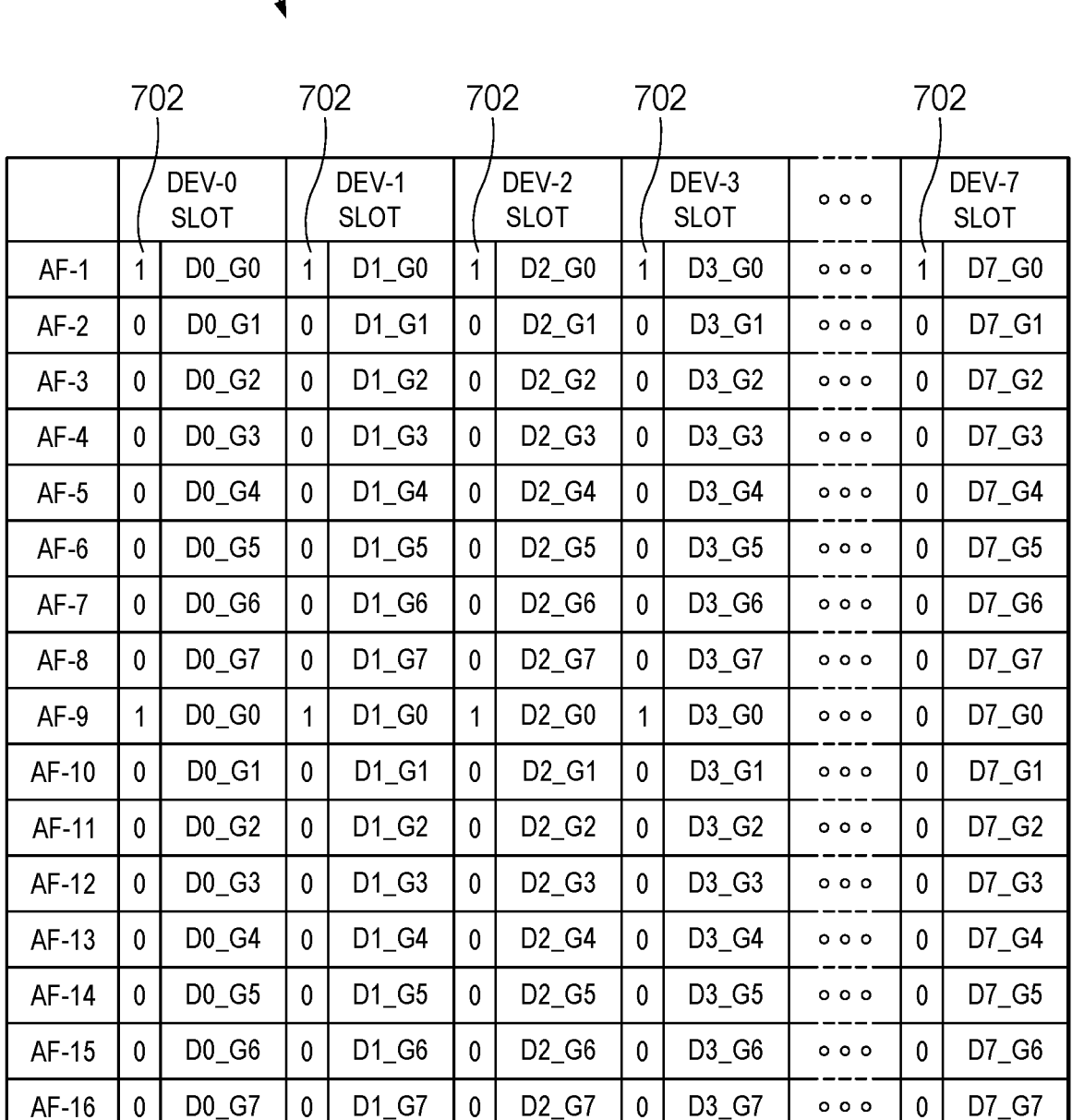
FIG. 7 is a table illustrating another technique to populate audio frames with gain settings, in an example.

FIG. 7 is a table 700 illustrating another technique for the audio devices 110 to exchange gain settings among themselves over bus 116. In this example, rather than each audio device 110 transmitting all of its gain settings in one audio frame, each audio device 110 transmits its gain settings spread across multiple (e.g., consecutive) audio frames. For example, audio device Dev-0 has eight gain settings D0_G0 through D0_G7. Audio device Dev-0 transmits gain setting D0_G0 in a first audio frame AF-1, gain setting D0_G1 in a second audio frame AF-2, and so on. The other audio devices 110 within the audio system similarly transmit their gain settings in consecutive audio frames. By using multiple audio frames, rather than just one audio frame, to transmit the gain settings for each audio device, each audio device has enough bits to adequately transmit all of its gain settings. The audio processing blocks do not necessarily run in each and every audio frame, and instead, may run once every N audio frames (e.g., N equal to 8). Such block-based processing rather than processing audio samples in each audio frame may reduce the over processing needs and power consumption. Accordingly, all of the gain settings need not be transmitted in each and every audio frame.

FIG. 7 also illustrates the use of a header bit 702. The use of the header bit 702 allows the audio devices 110 to synchronize themselves so that each audio device can match the gain settings received over bus 116 from other audio devices to the corresponding Audio Processing Block. For the first gain setting in a set of gain settings to be transmitted by an audio device 110, the audio device sets the header bit 702 to a first value. In the example of FIG. 7, the first value of the header bit 702 is "1.". Then, for the remaining gain settings of the set of gain settings being transmitted by the audio device 110, the audio device sets the header bit 702 to a second value (e.g., 0). Accordingly, as the other audio devices 110 in the audio system 100 receive the gain settings from a given audio device, such other audio devices can determine whether a received gain setting is the first gain setting in the set of gain settings or any of the subsequent gain settings in the set of gain settings. In one example, the audio devices 110 transmit their gain settings in a predetermined order. In that way, once an audio device detects a header bit for a received gain setting from another audio device equal to 1, the audio device determines that that particular gain setting is for a particular Audio Processing Block and also determines that each of the subsequent gain settings having a header bit equal to 0 are for specific Audio Processing Blocks.

Figure 8:
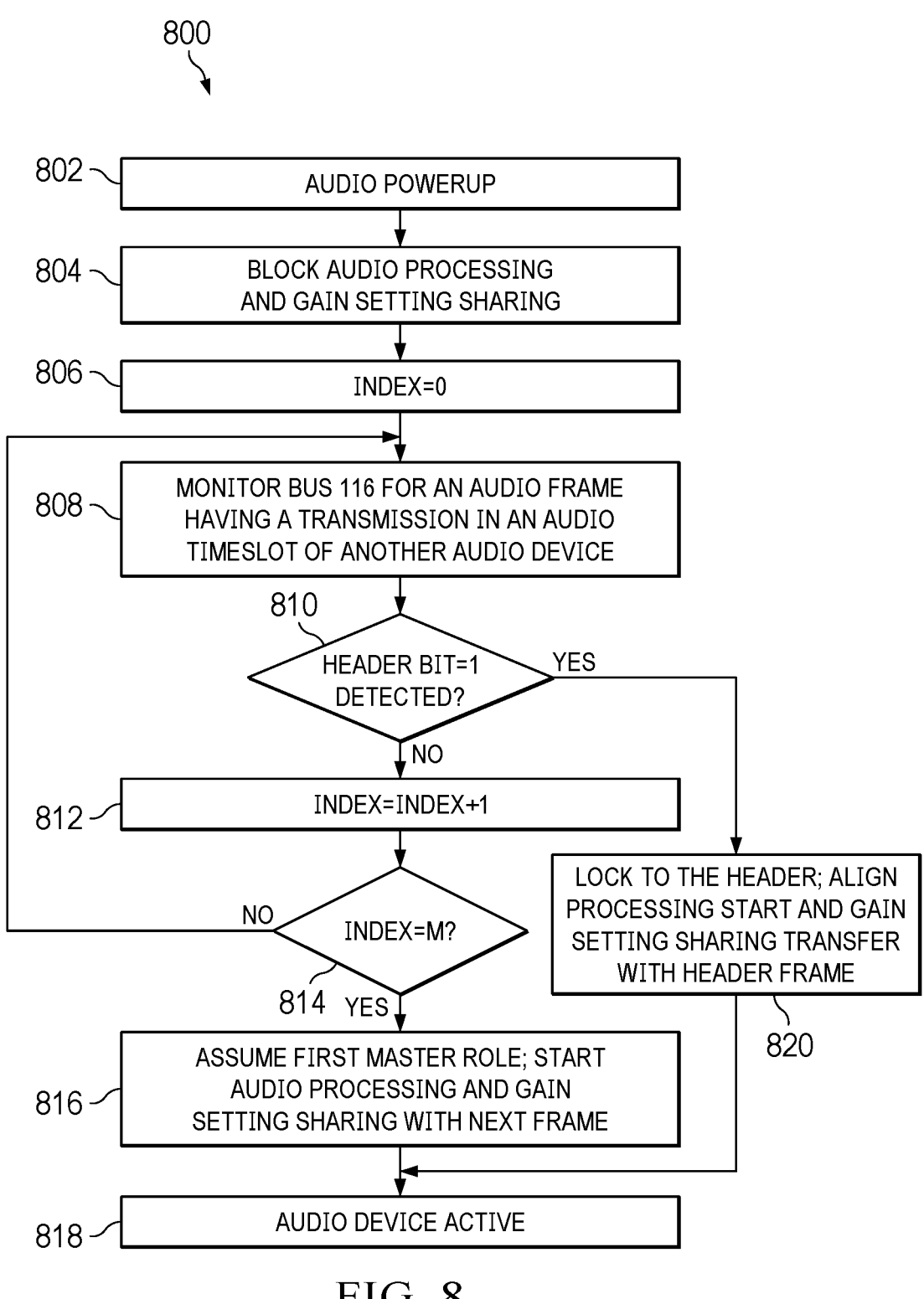
FIG. 8 is a flowchart illustrating the use of header bits to synchronize the transmission of gain settings between audio devices, in an example.

FIG. 8 is a flowchart 800 illustrating a method by which the audio devices 110 use the header bits to synchronize themselves. In some examples, the audio devices 110 power on in an asynchronous fashion meaning that the audio devices may power on at different times. Further, an audio device 110 may be replaced and the replacement audio device may power on while the other audio devices are already powered on. Accordingly, when an audio device 110 initially powers on, that audio device can determine whether any other audio devices are already powered on and transmitting gain settings with a header bit equal to 1. If the audio device detects gain settings on bus 116 having a header bit equal to 1, then the audio device synchronizes itself accordingly. If the newly powered on audio device does not detect any gain settings on the bus 116 with a header bit equal to 1, then the newly powered on audio device can transmit its own gain settings beginning with the first gain setting in its set of gain settings and setting a header bit 702 equal to 1.

The functional blocks shown in the example of FIG. 8 are from the vantage point of a single audio device. Each audio device may perform the same method upon being powered on. The functional blocks shown in FIG. 8 may be performed in the order shown or in a different order. Further, each functional block may be performed by the audio device's processor 320 executing the firmware 324.

At block 802, the audio device 110 powers on. At block 804, the audio device 110 blocks its audio processing and sharing of its gain settings with other audio devices. For example, the audio device does not provide any audio signals to its amplifier 340 for playback on speaker 112. The audio device also does not transmit any of its gain settings across bus 116.

At block 806, the audio device 110 initializes an index value to 0. At block 808, the audio device 110 monitors bus 116 for an audio frame having a transmission in any audio time slots of another audio device. Audio time slots are time slots in an audio frame. At decision block 810, the audio device 110 determines whether a header bit with a value of 1 is detected in the audio time slot(s) having a transmission. If the audio device 110 does not detect a header bit having a value of 1, then at block 812, the audio device 110 increments an index value by 1. At block 814, the audio device 110 determines whether the index value equals M, where M is an integer equal to the number of audio frames used to transmit a set of gain settings.

If the index value does not equal M, then control loops back to block 808, at which the audio device 110 continues to monitor bus 116 for an audio frame having a transmission in an audio time slot of another audio device. The index value will reach M if no other audio device has transmitted a header bit equal to 1 in the last M consecutive audio frames. If the index value has a value equal to M, then at block 816, the audio device 110 assumes the first master role, to which other devices can synchronize transmission, and starts its audio processing and gain setting sharing. For example, audio device 110 begins transmitting its gain settings along with the header bit information starting with the next audio frame. The audio device 110 starts the transmission with the header bit set to 1 in the (M+1)'th audio frame. The header bit of this device can be used by the other audio devices to align/synchronize themselves, e.g., in a slave role, to this device when they are powered on. At block 818, the audio device 110 is fully active for processing audio data on bus 114.

At block 810, if the audio device 110 detects, on bus 116, an audio frame having a transmission in a time slot from another audio device and having a header bit equal 1, then at block 820, the audio device 110 synchronizes itself to the progression of audio frames having a transmission by the other audio device. The audio device 110 aligns its audio processing and gain setting sharing based on the audio frames it has received. For example, the audio device 110 may wait for the next M−1 audio frames (which should have the next header bit equal 1) to begin transmitting its own gain settings. In beginning its transmissions, the audio device 110 sets the header bit to 1 and transmits its first gain setting in its allotted time slot to synchronize with other audio devices 110 within audio system 100. The audio device is fully active, in block 818, for processing audio data on bus 114.

The method described in FIG. 8 causes the audio devices 110 to align to the same transmission boundary of audio frames based on the header bits. This allows the pairing of audio devices to change quicker and more seamlessly upon a change in orientation of a tablet device.

FIG. 9 is an example table illustrating the powering up of four audio devices (Dev-0 thorough Dev-3) at different times. In the first audio frame AF-0, none of audio devices Dev-0 through Dev-3 are powered on. At the second audio frame, audio device Dev-0 powers on and performs the method of FIG. 8. During the next M (e.g., 8 in this example) audio frames, audio device Dev-0 monitors bus 116 for a header bit 702$a$, 702$b$, 702$c$, etc., equal to 1. Being the first audio device to be powered on, audio device Dev-0 does not detect any audio frames among audio frames AF-1 through AF-8 having a header bit 702$a$, 702$b$, etc., equal to 1. Accordingly, at audio frame AF-9, audio device Dev-0 sets the header bit 702$a$ to 1 and begins transmitting its set of gain settings D0_G0 through D-G7 across audio frames AF-9 through AF-16.

Audio device Dev-1 powers on at audio frame AF-12, and audio device Dev-3 powers on in the next audio frame (AF-13). Audio devices Dev-1 and Dev-3 also perform the method of FIG. 8. Within the subsequent M audio frames (from their power on event), audio devices Dev-1 and Dev-3 detect an audio frame (AF-17) having a transmission by audio device Dev-0 with a header bit 702$a$ equal to 1. Audio devices Dev-1 and Dev-3 synchronize their own gain setting transmissions starting with audio frame AF-25. In the example of FIG. 9, audio device Dev-0 may initiate powering off at audio frame AF-18 and complete its power off process at audio frame AF-24 to facilitate a smooth gain transition for its paired audio device's audio playback. Audio device Dev-2 powers on at audio frame AF-21. Audio device Dev-2 performs the same method of FIG. 8 and synchronizes its own gain setting transmissions starting with audio frame AF-33.

Figure 10:
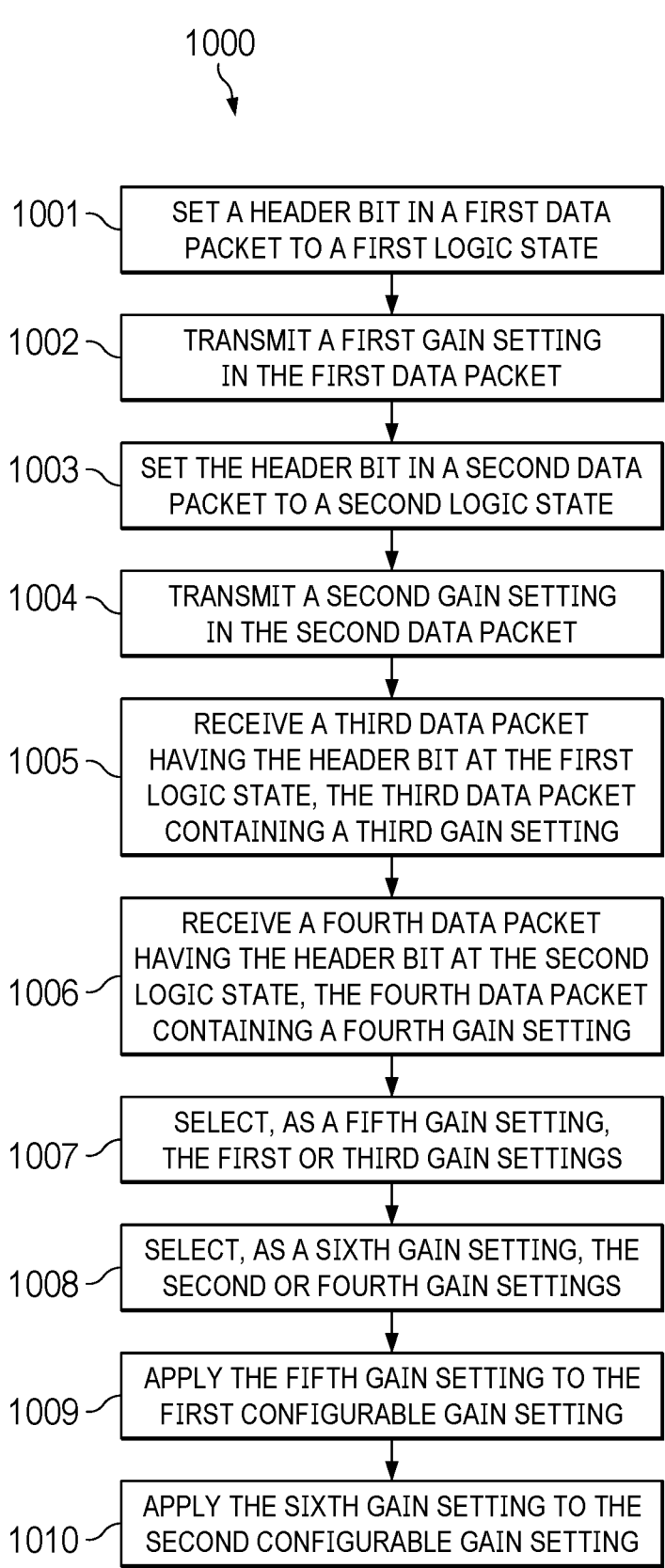
FIG. 10 is a flowchart illustrating the use of header bits to synchronize the transmission of gain settings between audio devices, in another example.

FIG. 10 is a flowchart 1000 illustrating a method by which an audio device determines which gain settings to use for its own Audio Processing Blocks. In this example, two or more of its Audio Processing Blocks have dynamically adjustable gain settings. The functional blocks in the example of FIG. 10 can be performed in the order shown or in a different order. Further, the functional blocks may be performed by the audio device's processor 320 executing its firmware 324.

At block 1001, the audio device sets the header bit 702 in a first data packet (e.g., audio frame) to a first logic state (e.g., 1). In general, a "data packet" refers to a structure that includes a header (e.g., a header bit) and is used to transmit data and/or control information or signaling, such as gain settings. In one example, the first data packet is or is part of an audio frame. At block 1002, the audio device transmits its first gain setting in the first data packet. The first data packet may be transmitted in a time slot within an audio frame, as described above. The audio device then sets (at block 1003) the header bit in the next data packet to a second logic state (e.g., 0), and transmits its second gain setting in the second data packet (block 1004).

The audio device receives data packets from another audio device (e.g., its paired audio device) in blocks 1005 and 1006 containing third and fourth gain settings. The header bit in the received data packet of block 1005 is set to the first logic state, and the header bit in the received data packet of block 1006 is set to the second logic state. The received third gain setting from the paired audio device is for the same Audio Processing Block as the first gain setting, and the received fourth gain setting is for the same Audio Processing Block as the second gain setting.

At block 1007, the audio device selects either its own first gain setting or the received third gain setting as a fifth gain setting. In one example, the audio device selects the smaller of the first and third gain settings to be the fifth gain setting. Similarly, at block 1008, the audio device selects either its own second gain setting or the received fourth gain setting as a sixth gain setting. In one example, the audio device selects the smaller of the second and fourth gain settings to be the sixth gain setting. At blocks 1009 and 1010, the audio device applies the fifth gain setting and the sixth gain setting as the adjustable gain settings of its respective Audio Processing Blocks.

As shown in FIG. 3 and described above, each audio device 110 includes a bus keeper circuit 319 as part of its interface 310. The bus keeper circuit 319 provides light loading on bus 116 to maintain the voltage on the bus at the level otherwise set by the P2S converter 316 to thereby prevent the interface 310 from allowing the bus 116 to float. In one example, the signaling protocol on the bus (e.g., for the SoundWire® protocol) is that a logic 1 is encoded by changing the voltage level from high to low, or vice versa, and a logic 0 is encoded by maintaining the voltage level on the bus unchanged. Accordingly, it is difficult for an audio device to differentiate between another audio device that is powered on versus an audio device that is powered off. For an audio device that is powered on, the audio device transmits logic 0's on bus 116. For an audio device that is powered off, the audio device's bus keeper circuit maintains the logic level of the bus unchanged, which would be interpreted by other audio devices as logic 0's. For example, for a first audio device paired to a second audio device that is powered on but transmitting logic 0's as its gain settings, the first audio device should adjust its own corresponding gain settings to logic 0's as well, as described above. However, if the second audio device happens to be powered off, the first audio device should not set its own gain settings to logic 0's simply because the first audio device's bus keeper circuit maintains the logic state of bus 116 at a level that would be interpreted as logic 0's by the first audio device.

To address this problem, each audio device has inversion circuits 314 and 317. When the audio device's processor 320 attempts to transmit a gain setting on to bus 116, header add circuit 318 adds the appropriate header bit (a 0 or a 1, as described above), and inversion circuit 317 performs a bitwise inversion of each bit of the gain setting (but not the header bit). Accordingly, each 0-bit in the gain setting is changed to a 1, and each 1-bit is changed to a 0. When an audio device 110 receives a gain setting from another audio device, the bits of the received gain setting have been inverted, and inversion circuit 314 inverts the bits back to their original logic state.

By performing a bitwise logical inversion of the bits of the gain settings, for a gain setting of all 0's (e.g., all bits of the gain setting equal 0), the audio device first inverts the bits to all 1's and the gain setting of all 1's is transmitted across bus 116. The paired audio device receives the inverted gain setting of all 1's. The paired audio device then inverts the bits back to all 0's. As described above, the paired audio device will select between its own gain setting, which has not been inverted, and the recovered original gain setting from its partner which is all 0's. The paired audio device may select the smaller of the two gain settings for the corresponding Audio Processing Block and accordingly select the gain setting of 0.

However, if the audio device is powered off, its bus keeper circuit 319 will maintain the loading on bus 116 to a constant voltage level, which will be interpreted by the paired audio device as all 0's. The paired audio device will then invert of the bits from all 0's to all 1's. Because its own gain setting will be smaller than all 1's, the paired audio device correctly selects its own gain setting for the corresponding Audio Processing Block.

Figure 11:
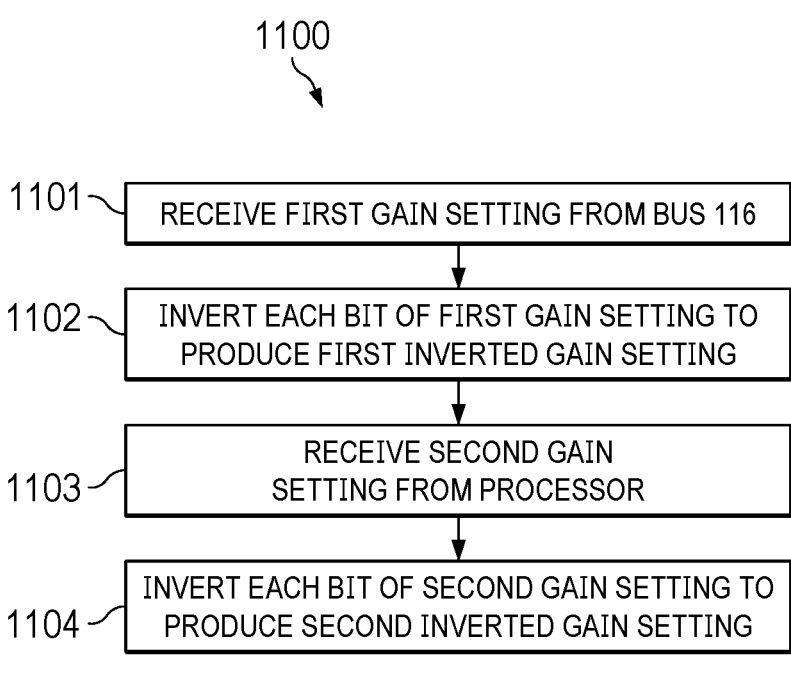
FIG. 11 is a flowchart illustrating the inversion of gain settings, in an example.

FIG. 11 is a flowchart 1100 illustrating a method for inverting the bits of the gain settings. The functional blocks in the method of FIG. 11 may be performed by an audio device's processor 320 executing its firmware 324. At block 1101, the audio device receives a first gain setting from bus 116. At block 1102, each bit of the received gain setting is logically inverted to produce a first inverted gain setting. Inversion circuit 314 may perform the bitwise inversion of block 1102. At block 1103, a second gain setting is received from the audio device's processor 320. This second gain setting is to be transmitted across bus 116. The audio device's inversion circuit 317 inverts the bits of the second gain setting to produce a second inverted gain setting. The second inverted gain setting may be transmitted by interface 310 across bus 116.

As described above regarding FIG. 3, memory 322 includes a CVR 326 and an NVR 328. Each of these registers may store the gain settings for the audio device as well as other types of information such as filter coefficients, the identity(ies) of other audio devices to which the audio device is presently paired, information indicative of the time slots of its paired audio device, etc. The audio device 110 configures itself (e.g., adjusts the gain settings of its Audio Processing Blocks) using the values in CVR 326. To change the configuration of audio device 110, processor 320 updates the values in the NVR 328 and then switches between using CVR 326 and NVR 328 at the next audio frame with a header bit 702 equal to 1. In one example, the register 326 or 328 that is currently being used to configure the audio device is referred to as the CVR, and the other register is the NVR. Accordingly, the use of a register 326, 328 as a CVR and as a NVR changes each time a switch occurs between the two registers.

Figure 12:
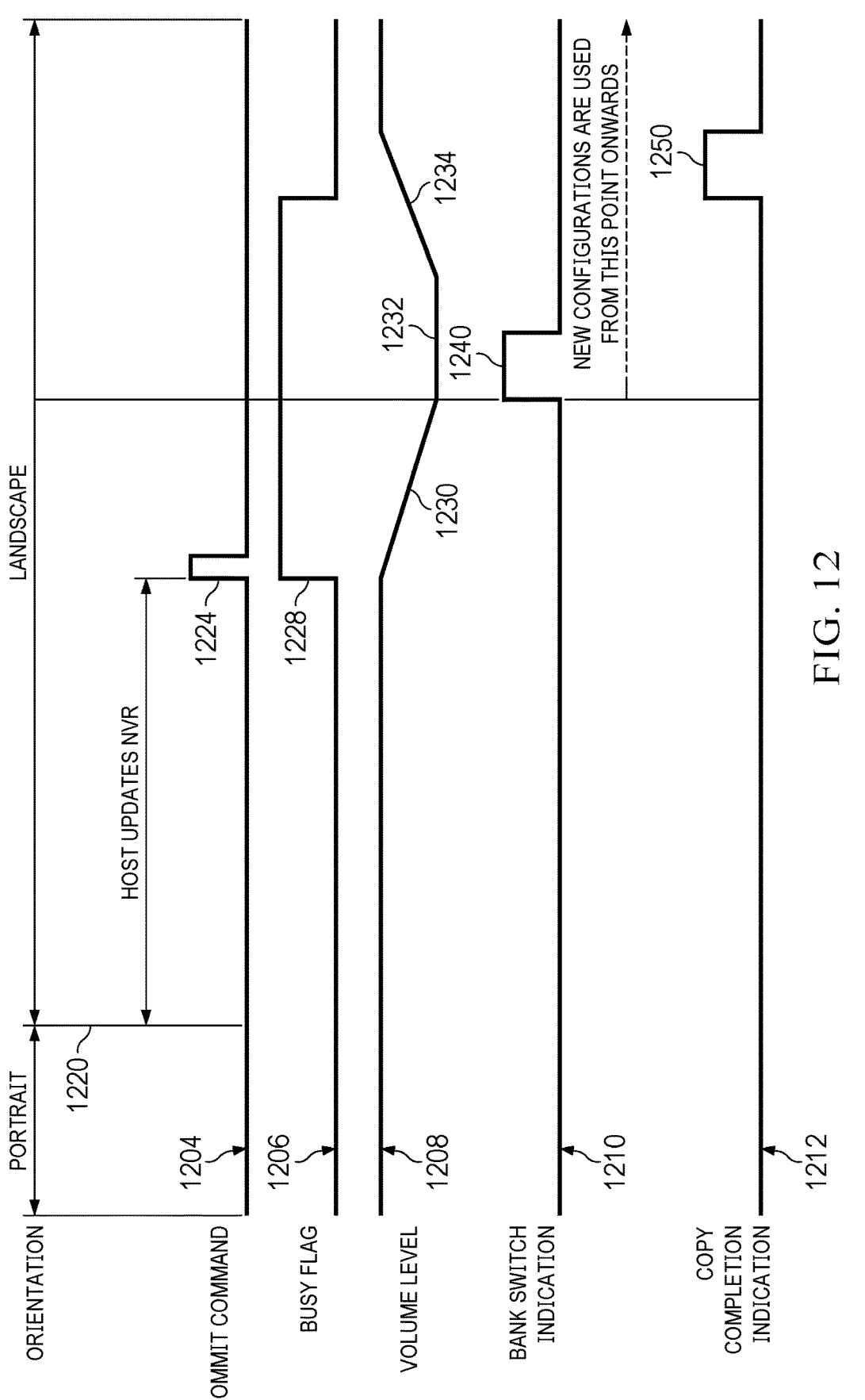
FIG. 12 shows waveforms illustrating decreasing the gain of an amplifier before changing its gain settings upon a change in orientation of the system, in an example.

FIG. 12 is a timing diagram illustrating an example of when the user of audio system 100 changes orientation, in this example from portrait to landscape. The signals shown in the timing diagram of FIG. 12 include a commit command signal 1204, a busy flag 1206, a volume level signal 1208, a bank switch indication signal 1210, and a copy completion indication 1212, across time. In an example, commit command signal 1204 and the busy flag 1206 are defined as part of the Soundwire Device Class Audio (SDCA) and Soundwire® protocols. In an example, the volume level signal 1208, bank switch indication signal 1210, and copy completion indication 1212.

At time 1220, audio system 100 changes from the portrait orientation to the landscape orientation. After detecting the change in orientation, the processor 102 updates the NVR 328 with new gain settings and other information such as filter coefficients for Audio Processing blocks that include a filter, pairing identifiers, time slot identifiers of paired audio devices, etc. Also, the host processor 102 asserts the commit command 1204 as a logic high pulse 1224 over bus 114. The asserted commit command indicates to the audio device 110 that it has new information in its NVR. The audio device 110 receives the commit command over bus 114 from the host processor 102. Responsive to the commit command, the audio device 110 asserts the busy flag 1206 as a logic high pulse 1228 and begins to process the new information. The asserted busy flag 1206 precludes the audio device 110 from processing any audio data which may otherwise be received from the host processor 102. The processor 320 of the audio device 110 also ramps down the volume, e.g., by decreasing a master volume setting, of its audio at 1230 from a higher value to progressively lower values. The NVR 328 has been updated by the time the commit command occurs to include any new gain settings, filter coefficients, pairing identities, etc.

Upon the volume being at a relatively low level 1232, processor 320 asserts the bank switch indication 1210 as a logic high pulse 1240 to cause a change-over from the CVR 326 to the NVR 328. In one example, the change from the CVR 326 to the NVR 328 is aligned with a gain setting transmission boundary for which the audio frame has a header bit 702 equal to 1 to avoid any temporary mixed gain setting problems (e.g., one paired audio device using an old gain setting while its partner audio device has already updated its gain setting). Processor 320 then causes the volume to ramp up at 1234 (e.g., ramp up the overall volume setting). By changing between the NVR 328 and the CVR 326 while the volume is lowered reduces any audio artifacts that may have otherwise occurred if the volume were higher. The content of the NVR 328, which is now the currently used register, may be copied at 1250 back to the CVR 326 (which now functions as the shadow register). By switching over the gain settings while the volume is at a lower level advantageously avoids the audio artifacts described above.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Modifications are possible in the described examples, and other examples are possible, within the scope of the claims.

What is claimed is:

1. An apparatus, comprising:
an amplifier having an input; and
a circuit having an output coupled to the input of the amplifier, the circuit including first and second audio processing blocks, the first audio processing block having a first adjustable gain setting, the second audio processing block having a second adjustable gain setting, the circuit configured to:
set a header bit in a first data packet to a first logic state, and transmit a first gain setting value for the first audio processing block in the first data packet;
set a header bit in a second data packet to a second logic state, and transmit a second gain setting value for the second audio processing block in the second data packet;
receive a third data packet having a header bit at the first logic state and containing a third gain setting value for a first audio processing block of a paired apparatus;
receive a fourth data packet having a header bit at the second logic state and containing a fourth gain setting for a second audio processing block of the paired apparatus;
set the first adjustable gain setting to the first or the third gain setting value; and
set the second adjustable gain setting to the second or the fourth gain setting value.

2. The apparatus of claim 1, wherein the circuit is configured to:
receive a fifth data packet having a header bit set to the first logic state; and
synchronize transmission of the first data packet based on the fifth data packet.

3. The apparatus of claim 1, wherein the circuit has a third audio processing block having a third adjustable gain setting, and wherein the circuit is configured to:
set the header bit in a fifth data packet to the second logic state, and transmit a fifth gain setting for the third audio processing block in the fifth data packet.

4. The apparatus of claim 3, wherein the circuit is configured to:
receive a sixth data packet having a header bit set to the second logic state and containing a sixth gain setting for a third audio processing block of the paired apparatus; and set the third adjustable gain setting to the fifth or the sixth gain setting.

5. The apparatus of claim 1, further comprising:
a first bitwise inversion circuit configured to invert each bit of the first adjustable gain setting to produce the first gain setting value and each bit of the second adjustable gain setting to produce the second gain setting value; and
a second bitwise inversion circuit configured to invert each bit of the third gain setting value and each bit of the fourth gain setting value.

6. The apparatus of claim 1, further comprising a first memory bank and a second memory bank, the first memory bank configured to store gain settings and pairing information, the second memory bank also configured to store gain settings and pairing information, and wherein the circuit is configured to, in response to receipt of a command:
decrease a volume setting of the apparatus;
switch between use of the first memory bank and the second memory bank; and
increase the volume setting of the apparatus.

7. The apparatus of claim 6, further comprising:
a display; and
a processor coupled to the circuit, the processor configured to detect a change in an orientation of the display and, in response to the detected change in the orientation, update the pairing information in one of the first or second memory banks and provide the command to the circuit.

8. The apparatus of claim 4, wherein the circuit is configured to select, as the fifth gain setting, a smaller of the first and third gain settings, and to select, as the sixth gain setting, a smaller o the second and fourth gain settings.

9. An apparatus, comprising:
an amplifier having an input;
an interface having inputs and an output, the interface configured to:
invert each bit of a value received at a first input of the interface to produce an inverted value; and
provide the inverted value at the output;
a processor having an input coupled the output of the interface, having a first output coupled to a second input of the interface, and having a second output coupled to the input of the amplifier, the processor configured to determine whether to set an adjustable gain setting of an audio processing block to the inverted value;
an audio processing block having the adjustable gain setting, wherein the processor is configured to:
provide a second value for the audio processing block; and
determine whether to set the adjustable gain value to the inverted value or the second value; and
a first memory bank and a second memory bank, the first memory bank configured to store gain settings and pairing information, the second memory bank also configured to store gain settings and pairing information, wherein the processor is further configured to cause, in response to receipt of a command via the interface:
a volume setting to be decreased;
switch between use of the first memory bank and the second memory bank; and
the volume setting to be increased.

10. The apparatus of claim 9, wherein the processor is a first processor, and the apparatus further comprises:
a display; and a second processor coupled to the processor, the second processor configured to detect a change in an orientation of the display and, in response to the detected change in the orientation, update the pairing information in one of the first or second memory banks and provide the command to the first processor.

11. The apparatus of claim 9, wherein the interface has a second output, and the interface is configured to invert each bit of the second value received at the second input to produce a second inverted value and to provide the second inverted value at the second output.

12. The apparatus of claim 9, wherein the interface is configured to:

receive the value in a first data packet having a header bit at to a first logic state;

transmit a second data packet including the second inverted value and having a header bit set to the first logic state;

receive a third data packet including a third value and having a header bit set to a second logic state and invert the third value; and invert bits of a fourth value received from the processor to produce a fourth inverted value and generate a fourth data packet having the fourth inverted value and having a header bit set to the second logic state.

13. The apparatus of claim 12, wherein the first data packet and the second data packet are part of a first audio frame, and the third data packet and the fourth data packet are part of a second audio frame.

14. An apparatus, comprising:

a first audio device having a first audio processing block and a first bus terminal, the first audio device configured to have a first set of gain settings;

a first speaker coupled to the first audio device;

a second audio device having a second audio processing and a second bus terminal coupled to the first bus terminal, the second audio device configured to have a second set of gain settings;

a second speaker coupled to the second audio device;

a processor coupled to the first and second audio devices, the processor configured to provide audio data to the first and second audio devices; and each of the first and second audio devices is configured to:

invert each bit of a first gain setting value to produce a first inverted gain setting value, set a header bit in a first data packet to a first logic state, and transmit the first inverted gain setting value in the first data packet through the respective first or second bus terminal;

invert each bit of a second gain setting value to produce a second inverted gain setting value, set a header bit in a second data packet to a second logic state, and transmit the second inverted gain setting value in the second data packet through the respective first or second bus terminal;

receive a third data packet via the respective first or second bus terminal, the third data packet containing a header bit at the first logic state and containing a third gain setting value, and cause each bit of the third gain setting value to be inverted to produce a third inverted gain setting value;

receive a fourth data packet via the respective first or second bus terminal, the fourth data packet containing a header bit at the second logic state and containing a fourth gain setting value, and cause each bit of the fourth gain setting value to be inverted to produce a fourth inverted gain setting value;

determine a fifth gain setting as a smaller of the first gain setting value and the third inverted gain setting value;

determine a sixth gain setting as a smaller of the second gain setting value and the fourth inverted gain setting value; and apply the fifth gain setting and the sixth gain setting to the respective first or second audio processing blocks.

15. The apparatus of claim 14, wherein each of the first and second audio devices includes a first memory bank and a second memory bank, the first memory bank configured to store gain settings and pairing information, the second memory bank also configured to store gain settings and pairing information, and wherein each of the first and second audio devices is configured to, in response to receipt of a commit command via an interface:

decrease a volume setting;

switch between use of the first memory bank and the second memory bank; and increase the volume setting.

16. The apparatus of claim 15, further comprising a display, and the processor configured to detect a change in an orientation of the display and update the pairing information in one of the first or second memory banks within the first and second audio devices.

17. The apparatus of claim 14, wherein the first data packet and the third data packet are part of a first audio frame, and the second data packet and the fourth data packet are part of a second audio frame.

18. The apparatus of claim 17, wherein the header bits of the first and third data packets are part of the first audio frame, and the header bits of the second and fourth data packets are part of the second audio frame.

* * * * *